United States Patent [19]

Kobler

[11] Patent Number: 5,234,110
[45] Date of Patent: Aug. 10, 1993

[54] POLYVINYL CHLORIDE-POLYETHYLENE TEREPHTHALATE SEPARATION PROCESS AND PRODUCT

[76] Inventor: Ronald W. Kobler, 4898 NE. Meadows Dr., Park City, Utah 84060

[21] Appl. No.: 980,309

[22] Filed: Nov. 23, 1992

[51] Int. Cl.$^5$ .................... B03D 1/02; B03D 1/008; B03D 1/014
[52] U.S. Cl. .................... 209/166; 252/61; 209/3; 209/11; 521/46.5; 521/48
[58] Field of Search .............. 209/166, 167, 11, 3; 252/61; 521/46.5, 48

[56] References Cited

U.S. PATENT DOCUMENTS

| | | | |
|---|---|---|---|
| 3,925,200 | 12/1975 | Izumi | 209/166 |
| 3,926,790 | 12/1975 | Izumi | 209/166 |
| 3,926,791 | 12/1975 | Izumi | 209/166 |
| 3,933,633 | 1/1976 | Saitoh | 209/166 |
| 3,941,688 | 3/1976 | Saitoh | 209/166 |
| 4,040,949 | 8/1977 | Saitoh | 209/166 |
| 4,046,677 | 9/1977 | Saitoh | 209/166 |
| 4,119,533 | 10/1978 | Saitoh | 209/166 |
| 4,617,111 | 10/1986 | Grimm | 209/167 |
| 5,120,768 | 6/1992 | Sisson | 209/166 |

FOREIGN PATENT DOCUMENTS 1444831 8/1976 United Kingdom ............... 209/166

OTHER PUBLICATIONS

Sisson et al; "Selective Surfactant (Froth) Flotation of Plastics"—Davos Recycle '92, Int'l Forum and Expo., Davos, Switzerland, Apr. 7-10, 1992.

Primary Examiner—Thomas M. Lithgow
Attorney, Agent, or Firm—Dressler, Goldsmith, Shore, Sutker & Milnamow, Ltd.

[57] ABSTRACT

A hydrophobic polyvinyl chloride chip composition is described which has a preferred affinity for air when in water. The chip is supernatant in water after contact with air and has a skin layer containing a surface conditioning agent.

A method for separating a PET/PVC chip admixture is also disclosed. The chip admixture is contacted with a surface conditioning agent to produce relatively hydrophobic polyvinyl chloride chips which can be floated in an aerated aqueous medium. The polyethylene terephthalate chips are recovered from the bottom of the aqueous medium. The flotation can be conducted in pure water without frothing or densifying agents.

10 Claims, 2 Drawing Sheets

POLYVINYL CHLORIDE-POLYETHYLENE TEREPHTHALATE SEPARATION PROCESS AND PRODUCT

TECHNICAL FIELD

This invention relates to a process for separating an admixture of polyvinyl chloride and polyethylene terephthalate chips and to a produced hydrophobic polyvinyl chloride chip composition.

BACKGROUND OF THE INVENTION

In recent years, more than five hundred million pounds of plastics have been recycled per year in the United States. Nevertheless, plastics continue to account for approximately 20% by volume of municipal solid waste. A major source of solid plastic waste is the "curbside mix" generated by residential households. In particular, soft drink bottles composed primarily of polyethylene terephthalate (PET) constitute a significant fraction of the curbside mix and represent an important recycling opportunity which has been the object of much research and development in the past decade.

Typically, plastic household wastes are chopped or ground to facilitate handling or processing. Contaminants to be separated thus exist as flakes within the recoverable bulk plastic. While some contaminants such as paper may be separated by air classification, other plastics, such as those that make up the polyethylene base cup of beverage bottles, can be separated from relatively denser plastic materials, such as polyester, on the basis of density differences in a water bath.

However, unplasticized polyvinyl chloride (PVC) plastic exhibits a specific gravity very similar to that of PET and cannot be separated from PET on the basis of density.

PET and PVC are found together in most residential waste streams, however. PVC is a popular molding resin material for manufacturing containers for edible oils, household cleaning solutions, detergents, and shampoos. Unfortunately, PET and PVC must not be remelted together because the resulting mixed melt produces hydrochloric acid gas which destroys the properties of the plastic material. A single pound of PVC can spoil several thousand pounds of reprocessed PET product for common reuse, e.g., for food grade container uses. For example, if PVC is present when PET is raised to its melting temperature the PVC will burn and char in a manner that produces gas bubbles in the PET and degrades its color. Thus, recycling of the plastic into other end products is precluded as a practical matter, unless PET and PVC are first separated in a recycling process.

Accordingly, attempts have been made to devise practical methods for separating PVC from PET. U.S. Pat. No. 3,925,200 to Izumi et al. and U.K. Patent No. 1,451,471 to Saitoh et al. describe methods for separating polyvinyl chloride from a mixture of plastics by a flotation process similar to processes utilized previously by the mining industry for separating ores.

In particular, plastics of varying hydrophobicity are placed in an aqueous liquid medium which is agitated by mechanical stirring or by the introduction of air bubbles. Polyvinyl chloride particles that separate out are removed as bottoms from the product aqueous liquid medium inasmuch as the polyvinyl chloride has a somewhat lower hydrophobicity and floatability than other plastics, and has a specific gravity relative to water greater than 1. The aforesaid patents teach that the polyvinyl chloride can be made even more wettable and less floatable by contact with a wetting agent such as a lignin sulfonic acid salt. However, because the process is predicated on sinking the polyvinyl chloride and floating the balance of plastics present, it is not well-suited to separating the plastic wastes produced by modern households that are predominantly polyethylene terephthalate. Currently, only a small fraction (about 3% by weight) of the curbside mix is polyvinyl chloride, thus the rest of the household plastic waste (about 97%) would have to be floated.

U.S. Pat. No. 4,617,111 to Grimm et al. describes a method for separating a mixture of polyvinyl chloride and polyethylene terephthalate particles. A low-density solvent is applied to all of the particles but is preferentially absorbed by the polyvinyl chloride particles in an amount sufficient to substantially lessen their density. The less dense particles are alleged to be separable from the polyethylene terephthalate particles by flotation or centrifugation. The low density solvent, which is applied as part of an aqueous sodium hydroxide solution, has a density of less than 0.95 grams per centimeter and may be an alcohol, ketone, ester, or ether. The polyvinyl chloride separated by the method necessarily contains a significant amount of the solvent. As these solvents are explosive, extreme danger exists during processing. Accordingly, the method is unattractive from a practical standpoint. The additional prospect of subsequently having to separate the solvent for reuse makes the method even less attractive to many recycling processors.

U.S. Pat. No. 4,031,039 to Mizumoto et al. proposes a method for treating a mixture of polymers including polyvinyl chloride by sequentially contacting the mixture with various solvents that are capable of completely dissolving one or more of the polymers. The individual polymers are later recovered from the solvent by fractionation. The method is relatively complicated and requires energy.

In conjunction with the separation methods described above, many recycling processors visually inspect the solid waste before it is chopped or ground and remove as many whole PVC containers as they can find. More recently, some robotic devices equipped with sensors for detecting polyvinyl chloride have been employed to help humans with this laborious task. Inevitably, polyvinyl chloride containers slip through undetected and contaminate the recovered polyethylene terephthalate. The current invention provides a method to recover plastic thus contaminated as well as a reusable product.

SUMMARY OF THE INVENTION

Polyvinyl chloride chips that are significantly more hydrophobic and floatable than polyethylene terephthalate chips can be recovered from a PVC/PET admixture by a procedure which is compatible with subsequent reprocessing of both the cleansed polyethylene terephthalate chips as well as the polyvinyl chloride chips separated therefrom. The relatively more floatable polyvinyl chloride chips have a relatively high affinity for air as compared to water or an aqueous medium, and are produced by contact with a surface conditioning agent applied in the presence of the polyethylene terephthalate chips which are relatively unaffected by the conditioning agent. After a PVC/PET chip admixture has been treated with the conditioning agent, the treated chip admixture is aerated in a water medium. As a result, the polyvinyl chloride chips become attached to air bubbles, rise to the surface, and are readily recovered. Polyester chips do not show such affinity, and remain in the bulk of the medium.

The recovered polyvinyl chloride chip has an exposed surface that is non-wettable by water. The non-wettable character of the surface makes the chip supernatant in water when contacted by air, even though the chip itself has a specific gravity greater than that of water. The PVC chip is of sufficient size to preclude small-scale surface tension effects which are sometimes responsible for the apparent floatability of very tiny particles on water.

Structurally, the PVC chip comprises a polyvinyl chloride polymer matrix which defines an outermost surface of the chip. A surface conditioning agent is present in the exterior or skin portion of the PVC chip in an amount sufficient to increase the hydrophobicity of the outermost surface to a level greater than that exhibited by polyethylene terephthalate surfaces of similar size. Furthermore, the penetration of the conditioning agent into the PVC polymer matrix is controlled so that essentially none of the conditioning agent is present in the interior portion of the chip. The hydrophobic-lipophobic properties, as well as other chemical and physical properties, of the interior portion remain unaltered by the conditioning agent.

Suitable surface conditioning agents generally possess solubility parameters and HLB numbers within identifiable ranges. By judicious selection of suitable processing conditions and conditioning agents, it is possible to limit the penetration of the surface conditioning agent to within about 100 microns of the external surface of the PVC polymer matrix.

DETAILED DESCRIPTION OF THE PREFERRED EMBODIMENTS

Figure 1:
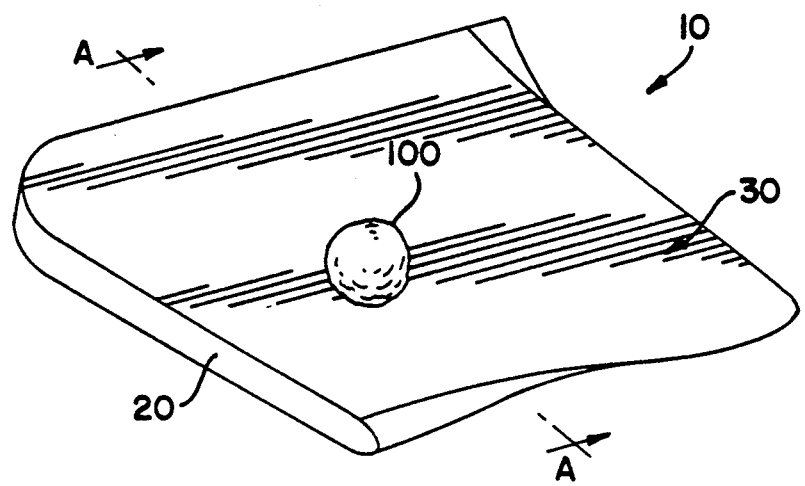
FIG. 1 is a perspective view of a relatively non wettable polyvinyl chloride chip of the present invention in contact with a drop of water.

The present invention provides a non-wettable polyvinyl chloride chip having an enhanced hydrophobicity, a method for producing the relatively non-wettable chip having a preferred affinity for air, and a method for separating a chip admixture of polyvinyl chloride and polyethylene terephthalate chips which utilizes the relatively non-wettable character of the polyvinyl chloride chip to facilitate separation.

The hydrophobic-lipophobic character of external surfaces of the polyvinyl chloride chips is altered by a surface conditioning agent which penetrates only a small distance into the chip, providing a skin portion having enhanced affinity for air but leaving interior portions of the chip unchanged. In the separation process, a polyvinyl chloride chip comes in contact with and adheres to an aqueous air bubble and rises to the surface of the aqueous medium. In this aerated aqueous medium the polyethylene terephthalate chips sink to the bottom or remain in the bulk of the agitated medium. Because only about 3% of household plastic solid wastes in the United States are composed of polyvinyl chloride plastics, the present separation process provides a higher separation efficiency and higher polyester purities which, in turn, result in high polyester recycle value for the final product. This beneficial economic effect is improves on prior separation processes that contemplate the floating and recovering of the relatively more abundant polyethylene terephthalate chips.

A polyvinyl chloride chip produced by the present invention is supernatant in water, despite the fact that the chip has a specific gravity greater than that of water. The chip is supernatant in that after the chip has been contacted with air, it rises in water and floats on the surface of the water, thereby allowing removal and separation. If the supernatant chip is forced beneath the surface of the water, it will rise again provided an air bubble is attached thereto. The external surface of the chip is non wettable, thus the separation process may be repeated several times to continue to improve the ultimate polyester purity. In fact, such supernatant polyvinyl chloride chips in water may be poured back and forth repeatedly between two beakers without losing their supernatant quality as long as some air is available for contact therewith during the pouring process. It is believed that the chips float because they possess a much greater affinity for an interface with air than with water.

As an example, a separation medium constituted by a mixture of water and diisodecyl phthalate as the conditioning agent was formed containing about 0.25 weight percent of the conditioning agent. The mixture was heated to 50-80 degrees C. To the heated mixture in a mixing tank was added PVC and PET chip admixture until the plastic solids made up 5% of the tank contents by weight. The PVC contained in the PET/PVC admixture amounted to approximately 3 percent by weight. The tank contents was stirred for time periods in the range of about 1 to 30 minutes. Upon turning off the tank's agitation and producing a still vessel, the PVC chips present floated prolifically with only minimal PET content in the float. A PVC removal of about 98% was achieved.

In further tests, a 300-gallon tank provided with a down pumping high speed marine-type propeller and containing the same separation medium and similar chip admixture was used. Air was injected just above the propeller to produce a dispersion of small air bubbles into the bulk of the separation medium. Upon allowing the tank contents to overflow into a quiescent portion of the tank, the PVC chips present again prolifically floated to the surface attached air bubbles. The bulk of PET chips present sank to the bottom of the tank and were recovered. Subsequent tests of the recovered polyester chips indicated about 98% PVC removal in a single such treatment step. Use of multiple treatment stages results in PVC removal to below 10 parts per million (ppm) in the recovered PET chips.

In any given installation for PET/PVC separation in accordance with the present invention various adjustable parameters are provided so that injected air quantity, bubble size, conditioning agent feed rate and concentration, and separation medium temperature can all be optimized for maximum removal efficiency for a particular PET/PVC feed admixture.

Referring now to the drawings, FIG. 1 depicts a polyvinyl chloride chip 10 having a specific gravity greater than 1 (water=1) and embodying the present invention. Chip 10 is constituted by a polyvinyl chloride polymer matrix 20 which defines a non wettable external surface 30. A drop of water 100 (not part of the invention) is shown resting upon the surface 30. The chip 10 has a shape which is typical of chips which have been comminuted for recycling, i.e., generally trapezoidal as produced in the chopping process. The length and width dimensions of such a chip are about 1 millimeter or more. The chip surface area is about 3 square millimeters and larger. A typical range of the surface area of such chips is about 5 $mm^2$ to about 150 $mm^2$, usually about 10 $mm^2$ to about 60 $mm^2$.

The non wettable surface has a critical surface tension which is less than the surface tension of water. The critical surface tension of a solid surface is the lowest surface tension which a liquid adjacent to the solid can have while maintaining a contact angle greater than zero degrees on that solid. The critical surface tension can be expressed in units of dynes per centimeter at a given temperature. Where no temperature is specified, the temperature of measurement is understood to be 25° C. by convention. For example, the critical surface tension of smooth, flat, essentially pure polyvinyl chloride is about 39 dynes per centimeter and the critical surface tension of polyethylene terephthalate is about 43. In comparison, the surface tension of water is about 72 dynes per centimeter at 25° C., decreasing approximately linearly to about 59 dynes per centimeter at 100° C.

The non-wettable surface for the PVC chips of this invention exhibits a contact angle with water in air of at least about 90 degrees. When a drop of liquid rests on a smooth and flat surface, unless spreading takes place, a liquid vapor interface with the surrounding atmosphere will form a finite angle with the solid surface. The angle is termed the contact angle and is designated herein by the symbol $\Theta$.

Figure 2:
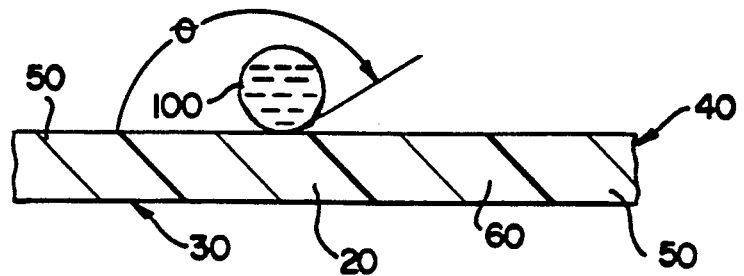
FIG. 2 is a cross-sectional view taken along plane A—A of FIG. 1 which illustrates a contact angle $\Theta$ for a drop of water on the polyvinyl chloride chip.

FIG. 2 is a cross section taken along plane A—A of FIG. 1. An exterior or skin region 40, located within the polymer matrix 20, is shown penetrated by a surface conditioning agent 50. The conditioning agent 50 enhances the non-wettable character of the surface 30 and thus decreases its critical surface tension. In contrast, interior portion 60 does not contain any of the conditioning agent 50.

The contact angle $\Theta$ is the angle which a drop of liquid freely assumes when placed in contact with an external surface, such as the surface 30. The angle $\Theta$ illustrated in FIG. 2 is greater than 90 degrees, as can be readily ascertained by comparing the relatively greater diameter of the drop of water 100 with the relatively smaller cross-sectional width of the contact area which the drop 100 shares with the chip 10.

A clean, untreated polyvinyl chloride chip surface, containing no plasticizer, emulsifiers, or other surface-active agents, exhibits a contact angle of about 82 degrees in proximity with liquid water against a background medium of air. By way of comparison, polyethylene terephthalate exhibits a contact angle with water of about 90 degrees. These contact angle values are the reported values for surfaces which are flat and smooth. When a surface is curved or is roughened, the contact angle may vary.

Plastics differ in chemical composition, plasticizer incorporated, degree of polymerization, crystallinity, surface roughness and shape. These differences are all believed to influence the contact angles to some extent. When the difference in contact angles between two types of plastic is more than about 4 degrees, preferably more than about 8 degrees, and most preferably more than 10 degrees, a separation of solid plastic chips can be achieved using air flotation techniques. Therefore, the surface conditioning agent 50 is present in the external region 40 of the polyvinyl chloride polymer matrix 20 in a concentration sufficient to increase the value of the PVC chip's contact angle with water to a value at least about 4 degrees greater than the contact angle exhibited by polyethylene terephthalate chips under similar conditions.

The critical surface tension and contact angle of materials are intimately related. Both can be altered by the presence of a surface conditioning agent. Preferred conditioning agents for the present purposes are selectively soluble in polyvinyl chloride and are capable of penetrating into the chip for a relatively small distance or depth. Extensive penetration into the polymer matrix of the chip is undesirable in that such relatively deep penetration would necessarily alter the characteristics of a substantial portion of each treated chip and could interfere with subsequent processing or recycling of the polyvinyl chloride.

The polyvinyl chloride polymer matrix is a structure constituted by polymer chains and cross links which includes interstitial pores. Polyvinyl chloride chips derived from household waste usually have a relatively open polymer matrix which has been found to be susceptible to penetration by certain surface conditioning agents. In contrast, polyethylene terephthalate of the type usually employed for soft drink bottles and other containers has a comparatively tight polymer matrix which is relatively resistant to penetration by such conditioning agents.

The surface conditioning agent suitable for present purposes is a liquid that is substantially more soluble in polyvinyl chloride polymer matrices than in polyethylene terephthalate matrices, and as such is readily absorbable into the PVC chip surface upon contact. In this manner the conditioning agent is capable of altering the outermost surface of the polyvinyl chloride matrices so as to exhibit a relatively lower critical surface tension and a relatively greater contact angle. However, the surface conditioning agent does not penetrate the polyvinyl chloride polymer matrix to a depth of more than about 100 microns so that the composition of the PVC chip remains substantially unaltered. Such conditioning agents generally have a solubility parameter $\delta$ in the range of about 6 to about 16 $(J/cm^3)^{0.5}$, preferably about 6 to about 8. The solubility parameter $\delta$ of a conditioning agent is defined as the square root of energy of vaporization per cubic centimeter of the conditioning agent.

Utilizing this definition, the solubility parameters of liquids can be calculated directly from vaporization and density data. On the other hand, the solubility parameter of a solid polymer must be inferred. Substantially pure polyvinyl chloride has a solubility parameter $\delta$ of 19.4, and polyethylene terephthalate has a solubility parameter $\delta$ of 21.9, as determined by observing the polymers in contact with various solvents of known solubility parameters. It is generally agreed that polymers exhibit maximum swelling when in contact with a solvent of equal solubility parameter. For the present separation process, however, the value of solubility parameter δ of the conditioning agent is less than that of the solubility parameter δ of the PVC chips to be separated.

HLB number is another indication of a conditioning agent's suitability for use in the present invention. The system of HLB numbers semi-empirically catalogues and predicts the surface-active properties of compounds which possess both hydrophilic and lipophilic structural units. It is useful for characterizing emulsifying agents, surfactants, and surface conditioning agents. For a more complete description of the HLB number and its applications, see Shinoda et al. Emulsions and Solubilization, pages 68 to 88, John Wiley & Sons, Inc., New York (1986).

In the present context, without being bound by any particular theory, it is believed that surface conditioning agents having an HLB number in an ascertainable range are more likely to penetrate the polyvinyl chloride matrix to the desired depth and no further. Preferably, the surface conditioning agent has an HLB number in the range of 1 to about 5, more preferably of about 2 to about 3.

The surface conditioning agent contemplated by the present invention in its several aspects is a liquid that is readily absorbable into the surface of a PVC chip upon contact, and preferentially soluble in the polyvinyl chloride polymer matrix as compared to the polyethylene terephthalate matrix that constitutes the PET chips present in the PVC/PET chip admixture.

Suitable for the present purposes are liquid organic esters and ethers that are commercially available as a so called monomeric primary plasticizer, as long as the aforesaid criteria can be met. Illustrative of such surface conditioning agents are esters made from dibasic acids or their anhydrides, diesters made from polyols and monobasic acids, and the like.

Illustrative of the esters made from dibasic acids or their anhydrides are the aliphatic dicarboxylic acid derivatives, e.g., the adipic acid derivatives such as diisobutyl adipate, di-(2-ethylhexyl) adipate, didecyl adipate, mixed straight chain alcohol adipates, and the like, the azelaic acid derivatives such as di-(2-ethylhexyl)azelate, dibutoxyethyl azelate, and the like, the glutaric acid derivatives such as diisodecyl glutarate, dialkyldiether glutarate, mixed dialykyl glutarates, and the like.

Likewise, illustrative aromatic dicarboxylic acid derivatives are the phthalic acid derivatives such as dibutyl phthalate, diisobutyl phthalate, dihexyl phthalate, diisoheptyl phthalate, diisononyl phthalate, nonyl undecyl phthalate, diisooctyl phthalate, dioctyl phthalate, di-(2-ethyhexyl) phthalate, diisodecyl phthalate, ditridecyl phthalate, mixed n-alky phthalates, and the like.

Particularly preferred for the present purposes are the branched $C_4$-$C_{10}$ phthalates such as di-(2-ethylhexyl) phthalate, diisodecyl phthalate, diisooctyl phthalate, diisononyl phthalate, diisoheptyl phthalate, and the like.

Illustrative of the diesters made from polyols and monobasic acid are the benzoic acid derivatives such as isodecyl benzoate, glyceryl tribenzoate, dipropylene glycol dibenzoate, tetraethylene glycol di-(2-ethylhexoate), and the like.

Also suitable for the present purposes are the liquid phosphoric acid derivatives such as tri-(2-ethylhexyl) phosphate, tricresyl phosphate, trioctyl phosphate, and the like.

Contacting of the PVC/PET chip admixture with the liquid surface conditioning agent can be effected by spraying the conditioning agent neat onto an agitated chip admixture, by tumbling the chip admixture into a liquid pool of the conditioning agent, by contacting with a suspension of the conditioning agent in an aqueous medium, or in any other convenient manner.

Inasmuch as the presently contemplated liquid surface conditioning agents are absorbed only into the skin layer of the PVC chips and a relatively small amount of the liquid agent is required to impart the non-wetting surface characteristic to the PVC chips that are present in the admixture, it is preferred to utilize an aqueous suspension of the liquid surface conditioning agent to achieve the desired contacting. To that end, it is particularly preferred to utilize a substantially homogeneous blend of the agent droplets (especially diiosdecyl phthalate droplets) in a continuous water medium that is substantially free from surfactants or similar additives. The size of the individual liquid agent droplets is sufficiently small to preclude stratification upon standing.

Figure 3:
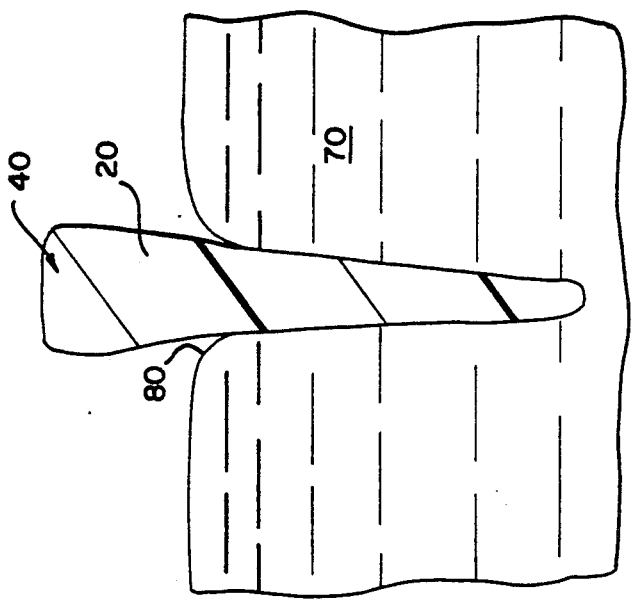
FIG. 3 is a cross-sectional view of a relatively hydrophobic polyvinyl chloride chip immersed in water and showing a positive or convex meniscus at the contact boundary between the chip and the water.

The non-wettability characteristic of the recovered polyvinyl chloride chip, comprising one aspect of this invention, can also be tested by immersing such a chip having a relatively flat and smooth surface in water, and observing the upper surface boundary of the water immediately adjacent the chip. As illustrated in FIG. 3, if the upper surface of the water 70 forms a convex region 80 near the surface 30 of the chip, the surface is non-wettable by water. The convex region is commonly referred to as a positive meniscus.

In another aspect, the present invention provides a process for separating comminuted plastic chips so as to readily segregate and remove PVC chips therefrom. This process entails first contacting a PET/PVC chip admixture with a surface conditioning agent that is selectively soluble in the polyvinyl chloride polymer matrices for a time period sufficient to enhance the hydrophobicity of the PVC chip surfaces. Thereafter the resulting chip admixture, containing PVC chips exhibiting enhanced hydrophobicity, is aerated in an aqueous medium. Upon aeration, the PVC chips of enhanced hydrophobicity become supernatant and rise to the surface of the aqueous medium where they can be readily recovered and segregated by skimming from the PET chips which sink or remain in the bulk of the separation medium.

The present process can be carried out in a single process vessel or tank where the contacting step and the aeration step are performed substantially concurrently. Alternatively, the contacting step can be implemented first in several ways that will be discussed in greater detail hereinbelow, and then followed by the aeration and flotation separation step or steps as desired.

Figure 4:
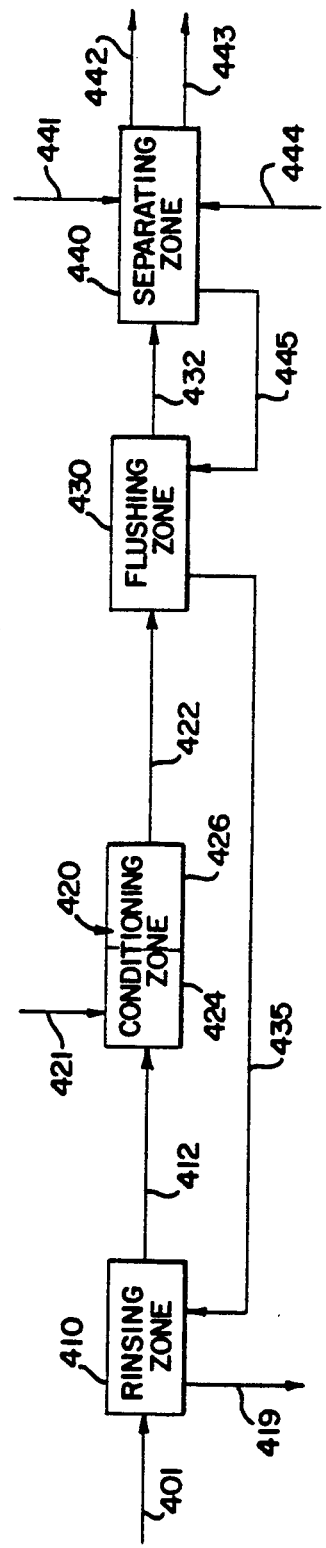
FIG. 4 is a process flow block diagram which depicts the relationship between major process steps of the present process for separating PVC chips from PET chips.

Referring now to FIG. 4, a feed stream 401 containing an admixture of polyvinyl chloride chips and polyethylene terephthalate chips is transported into a rinsing zone 410. The chip admixture has been previously chopped or ground to produce chips of a size which can be conveniently handled by available process equipment. The chips usually have length and width dimensions of more than 1 millimeter. Often the dimensions are in the range of about 5 to about 10 millimeters.

Additionally, the chip admixture constituting the feed stream 401 can be previously cleaned, as by washing and rinsing with a surfactant and water. Materials such as paper labels and beverage syrups usually are removed from the chip admixture prior to processing. The purpose of this pre treatment is to remove other foreign matter such as beverage syrups which may cause air to adhere to the polyester surface and thus promote unwanted flotation and subsequent cross contamination, as well as yield loss of polyester from the feed stream being treated. The feed stream 401 may be composed primarily of solids, in which case the feed stream 401 is conveniently transported by a screw conveyor. Alternatively, the feed stream 401 may be in the form of a pumpable aqueous suspension or a fluidized stream.

The source of the chip admixture in the feed stream 401 is frequently a community curbside collection of various plastic bottles. Accordingly, the chip admixture potentially contains all plastic bottles which are ordinarily found in a home. The bottles are bagged, collected, baled, and transported to a processor for recycling. Many processors remove plastic milk bottles and detergent bottles manually. The remaining bottles, primarily polyethylene terephthalate bottles, both green and clear, and contaminant polyvinyl chloride bottles, are often too similar in appearance to the polyethylene terephthalate bottles to permit workers to separate them by visual inspection when the bottles are processed at high speed. Typically, this feed stock of polyethylene terephthalate and polyvinyl chloride bottles contains about 3% by weight of polyvinyl chloride bottles.

A primary function of the rinsing zone 410 is to remove beverage syrup contaminants and cleaning system surfactants from the chip admixture carried by the feed stream 401 which might otherwise subsequently interfere with the action of a surface-conditioning agent or cause unwanted selective flotation. The unwanted surfactant may be residue from materials which were stored in containers that are now being recycled. Other undesirable surfactants are soaps introduced into the feed stream 401 during prior washing steps undertaken as part of the recycling process, or present in detergent or shampoo bottles coming from the curbside stream. A rinse effluent stream 419 carries the unwanted surfactant out of the rinsing zone 410, preferably to a water-treatment facility.

A rinsed feed stream 412 is transported to a conditioning zone 420. It is preferred that the rinsed feed stream 412 be constituted primarily by solid chips, with a minimum of liquid, which may be conveniently moved into the conditioning zone 420 by a screw conveyor or similar apparatus. Other floatable plastics such as polyolefins are generally separated in a prior step to reduce the possibility of unwanted cross reactions.

A conditioning stream 421 enters the conditioning zone 420 at a controlled rate calculated to produce an aqueous dispersion in the conditioning zone 420 having a predetermined concentration of the surface conditioning agent. The aqueous dispersion is contacted with the chip admixture in one or more contact stages, each of which preferably has a separate and independently controllable circulating and conditioning agent addition system. Most suitable conditioning agents are no more than sparingly soluble in water.

The concentration of the surface conditioning agent in the aqueous dispersion of the conditioning zone 420 is maintained at a level commensurate with temperature and residence time to increase the non wettable character of the polyvinyl chloride chips in the chip admixture by a significant amount. Preferably, in a dispersion the surface conditioning agent is present in an amount of about 0.005% to about 1% weight percent, based on the weight of an aqueous dispersion thereof. While in theory 100% conditioning agent produces the desired effect, the economics of such high concentrations are likely to be prohibitive. The conditioning may be conducted at a temperature above ambient but below the boiling point of water. Elevated temperatures accelerate the rate of the conditioning process. A temperature in the range of about 35° C. to about 95° C. is preferred, with a temperature in the range of about 60° C. to about 80° C. being especially preferred. Total residence time in the contacting zone is preferably in the range of about 1 to about 60 minutes, the total residence time being the sum of the residence times in the individual contacting stages if more than one contacting stage is utilized.

Alternatively, the conditioning agent may be applied to the chip admixture by tumbling the chips together with the conditioning agent. In that case, the conditioning agent can be sprayed upon the surface of the chip admixture as it is tumbled, either with or without a carrier liquid for the conditioning agent. As another alternative, the chip admixture can be tumbled in a liquid pool of the conditioning agent. The chip admixture is contacted by tumbling in the liquid pool for about 1 to about 60 minutes at a temperature above ambient but below the softening temperature of any of the chips in the chip admixture.

In a preferred form of the invention, the conditioning zone 420 includes two mixing tanks (424 and 426) in series. The mixing tanks and their contents are heated, as by steam, to control the temperature and increase the rate of conditioning. The rinsed feed stream 412, containing both polyvinyl chloride and polyethylene terephthalate chips, enters the first of the two mixing tanks, i.e., mixing tank 424. Liquid is recirculated between the first and second of the mixing tanks. When the recirculated liquid contacts the incoming chip admixture in rinsed feed stream 412, a slurry of plastic chips and liquid containing preferably about 5% by weight of solids is produced. The contents of the mixing tanks (424 and 426) is also mechanically agitated to promote mixing and in some cases to introduce air for flotation.

The recirculated liquid travelling from the first to the second of the mixing tanks (424 and 426) carries the chip admixture to the second mixing tank 426 after a single stage residence time of about 8 minutes. In the second of the mixing tanks, the PVC/PET chip admixture is further contacted with the conditioning agent.

Concentration of the conditioning agent in the aqueous suspension, temperature, total residence time, and degree of agitation within the conditioning zone 420 are believed to be important process variables which affect the rate and level of surface conditioning of polyvinyl chloride chips. These four factors are controlled to render the external surfaces of the polyvinyl chloride chips relatively more hydrophobic, as compared to surfaces of the polyethylene terephthalate chips. Recycling processors will appreciate that the critical surface tensions or, alternatively, the contact angles of polyvinyl chloride chips and polyethylene terephthalate chips leaving the conditioning zone 420 can be measured experimentally and correlated with the parameters of the conditioning zone 420 and the efficiency of a subsequent air flotation step in order to identify the best ranges for conditioning zone operation. Depending upon the severity of aerating agitation in the conditioning zone, at least some of the treated, supernatant PVC chips can be segregated from the chip admixture at this stage.

A conditioned stream 422 containing the chip admixture travels from mixing tank 426 to a flushing zone 430. Preferably, the conditioned stream 422 contains a minimum of liquid so as to retain as much as possible of the conditioning agent within the conditioning zone 420. A minimal use of the conditioning agent can thus be achieved with favorable economics. The flushing zone 430 employs a flush liquid stream 445 which is constituted substantially by water. The conditioned chip admixture carried by stream 422 is agitated in contact with the flush liquid stream 445 or subjected to relatively high velocity jets formed by the flush liquid stream 445, as convenient. Virtually all of the surface conditioning agent which has not penetrated into the polymer matrices of the polyvinyl chloride chips is now flushed away from the chips and transported out of the flushing zone 430 by the rinse liquid stream 435. A flushed chip admixture is produced which is carried within the flushed chip stream 432 to separating zone 440.

In the separating zone 440, air bubbles from an air injection system 444 rise through the treated chip admixture in an aqueous medium. The air bubbles are of a size that has sufficient buoyancy to float the polyvinyl chloride chips, preferably 0.25 to 3 millimeters in diameter. When a treated polyvinyl chloride chip contacts one of the air bubbles, the chip de-wets and becomes attached to the air bubble. In contrast, polyethylene terephthalate chips, which are relatively less hydrophobic, do not de-wet, but remain wetted in the bulk of the aqueous medium of the separating zone 440 and eventually sink to the bottom. As the air bubbles that are attached to the treated polyvinyl chloride chips rise to the surface, the polyvinyl chloride chips, now supernatant, remain at or near the surface of the aqueous medium where they are removed by skimming or by overflowing a weir. A makeup water stream 441 enters the separating zone 440 to replace the volume of the flush liquid stream 445, which exits the separating zone 440 and passes to the flushing zone 430.

It is preferred that the rate of the flushed chip stream 432 be adjusted to produce a dispersion averaging approximately 5 weight percent solids when blended with the aqueous medium of the separating zone 440. Preferably, the chip admixture is exposed to the separating zone 444 for a total residence time in the range of about 5 to about 40 minutes at a temperature similar to that used in the conditioning zone 440, usually in the range of about 60° to about 80° C. If multiple flushing zones are employed, each may be at a different temperature to facilitate various degrees of flotation at various induced bubble sizes.

Any of various commercially available flotation aeration systems, as used in the mining industry, for example, may be employed in the separating zone 444. A preferred type of flotation aeration system is equipped with a dispersing and stirring mechanism which acts to stir the aqueous medium of the separating zone 444 as well as to produce the air bubbles from the air injection stream 444 for flotation. Preferably, a multiple stage system is employed in the separating zone 444, utilizing various tanks in series.

The skimmed or overflowed polyvinyl chloride chips leave the separating zone in a polyvinyl chloride product stream 442. Similarly, polyethylene terephthalate chips are removed from the bottom of the separating zone 440 via a polyethylene terephthalate product stream 443. Screen buckets can be used to strain the product streams (442 and 443) to obtain samples of the recovered chips. The efficiency of the separation of chips between the two product streams (442 and 443) guides the recycling processor in further adjusting the operation of the conditioning zone 420.

The polyvinyl chloride chips in the product stream 442 leave the separating zone 440 ready for further processing and recycling or, alternatively, for disposal as the recycling processor may choose. The PVC chip purity can be improved if the PVC quantity warrants economic recovery. This can be accomplished by subjecting the PVC rich admixture with some PET to additional stages of conditioning and or aeration with subsequent separations. The polyethylene terephthalate chips of the product stream 443 are substantially free from polyvinyl chloride chips, are recovered from separating zone 440 in any convenient manner, and may be safely processed for reuse. The separation is accomplished without substantially altering the nature of either the PVC or the PET chips and, therefore, may be properly deemed to be a non destructive separation. Further, the chips are separated without the use of frothing agents, such as water-soluble organic materials, or of densifying agents, such as salts, in the aqueous medium of the separating zone. In most cases, air need only be injected in a quantity sufficient to float a small fraction of the total chips which are introduced to the separating zone.

Unlike prior separation processes, the pronounced hydrophobic character of the conditioned PVC chips produced in accordance with the present invention do not require a froth bubble layer to be established in the separation zone to achieve recovery.

Preferred embodiments of the invention, examples, and theories have been described herein to fully communicate the invention, without intending to limit the claims in any way. Similar embodiments will doubtless become apparent to practitioners who study these teachings, but such similar embodiments are also within the spirit and scope of the present invention, which is to be limited only by the ensuing claims.

What is claimed is:

1. A process for separating polyvinyl chloride chips from polyethylene terephthalate chips, which comprises:

conditioning a chip admixture constituted by polyethylene terephthalate chips and polyvinyl chloride chips having polyvinyl chloride polymer matrices that define external surfaces, with a surface conditioning agent that is selectively soluble in the polyvinyl chloride polymer matrices and renders the surfaces of the contacted polyvinyl chloride chips relatively more hydrophobic, said surface conditioning agent comprises one agent selected from the group consisting of diesters of aliphatic dicarboxylic acids, diesters of aromatic dicarboxylic acids, polyol polybenzoates, and trialkyl phosphate, said contacting being continued for a time period sufficient to cause the conditioning agent to penetrate the polyvinyl chloride chips and to produce a treated chip admixture;

aerating the conditioned chip admixture while the conditioned chip admixture is in an aqueous medium having a surface tension not less than that of water, so as to contact air bubbles with the treated chip admixture; said air bubbles being of sufficient size to impart buoyancy to the air bubble contact polyvinyl chloride chips; and thereafter recovering polyvinyl chloride chips from the surface of the aqueous medium.

2. The process in accordance with claim 1 wherein the chip admixture is conditioned with an aqueous dispersion of the conditioning agent in water.

3. The process in accordance with claim 2 wherein the chip admixture is conditioned with said aqueous dispersion for a time period in the range of about 1 minute to about 60 minutes at a temperature above ambient but below the boiling point of water.

4. The process in accordance with claim 2 wherein the chip admixture is conditioned at a temperature in the range of about 35° C. to about 95° C.

5. The process in accordance with claim 1 wherein the chip admixture is conditioned with the conditioning agent by tumbling in a liquid pool of the conditioning agent.

6. The process in accordance with claim 5 wherein the wherein the chip admixture is conditioned with the conditioning agent for a time period in the range of about 1 minute to about 60 minutes at a temperature above ambient but below the softening temperature of any of the chips constituting said chip admixture.

7. The process in accordance with claim 1 wherein said conditioned chip admixture is aerated in said aqueous medium at a temperature in the range of about 60° C. to about 80° C.

8. The process in accordance with claim 1 wherein the conditioned chip admixture is flushed to remove extraneous surface conditioning agents therefrom prior to said aerating in said aqueous medium.

9. The process in accordance with claim 1 wherein the conditioning agent comprises dialkyl phthalate.

10. The process in accordance with claim 1 wherein the conditioning agent comprises diisodecyl phthalate.

* * * * *